United States Patent Office 3,228,996
Patented Jan. 11, 1966

3,228,996
CROSSLINKING LINEAR HIGH MOLECULAR WEIGHT POLYAMIDES WITH PEROXIDES
Gerhard Illing, Neuleiningen, Pfalz, and Hermann Linge and Richard Schoeffel, Ludwigshafen (Rhine), Germany, assignors to Badische Anilin- & Soda-Fabrik Aktiengesellschaft, Ludwigshafen (Rhine), Germany
No Drawing. Filed May 10, 1962, Ser. No. 193,865
Claims priority, application Germany, May 17, 1961, B 62,519
9 Claims. (Cl. 260—857)

This invention relates to a process for crosslinking synthetic linear high molecular weight polyamides.

It is known that polyamides can be crosslinked by reaction with diisocyanates. Products of very high molecular weight are thus obtained, however, which cannot be processed into moldings in the conventional screw or plunger type injection molding machines and cannot be blown into sheets. It is also known to prepare crosslinked polyamides by polycondensation of lactams, such as caprolactam or dicarboxylic acid salts of diamines, such as hexamethylenediamine adipate, with the addition of about 1 to 10% by weight of bislactams, such as methylene-bis-caprolactam. Crosslinked polyamides are thus obtained having melt viscosities between 10,000 and 100,000 poises, which are difficult to process into shaped articles in conventional injection molding machines.

It is known that the toughness of non-crosslinked high molecular weight polyamides is very closely dependent on their water content. For example they have notched impact strengths when tested according to DIN 53,453 of less than 30 cm. kg./sq. cm. at water contents below 1%. The same high molecular weight polyamides, after saturation with water, are very tough and standard notched test bars prepared therefrom according to DIN 53,453 do not rupture under the conditions of this test specification. Although crosslinked polyamides prepared in conventional manner are somewhat tougher than non-crosslinked polyamides at water contents below 1% by weight, not only their processability, but also their notched impact strength at water contents below 1% by weight leaves much to be desired.

It is an object of the present invenion to provide a new process for the production of crosslinked synthetic polyamides. A further object of this invention is a process for the production of crosslinked synthetic polyamides which can be processed particularly rapidly by conventional injection molding and/or extrusion processes into shaped articles. A further object of this invention is a process for the production of crosslinked synthetic polyamides which exhibit a particularly high notched impact strength. Other objects of the invention will become apparent from the following description.

These objects are accomplished by intensely kneading a mixture of molten synthetic linear high molecular weight polyamides and 0.1 to 2% by weight, preferably 0.3 to 0.8% by weight, based on the total weight of the mixture, of free radical forming catalysts.

It is surprising that crosslinked high molecular weight polyamides are thus obtained which are practically colorless and which especially at water contents below 1% by weight are distinguished by particularly high impact strength, because polyamides are known to be sensitive to oxygen at elevated temperatures and must therefore be processed in the absence of oxygen in order to avoid discoloration and impairment of mechanical properties. It is moreover surprising that the crosslinked polyamides prepared according to the invention can be processed particularly rapidly by the injection molding and extrusion processes into shaped articles.

Synthetic linear polyamides of high molecular weight included within the scope of this invention are polycondensates of lactams having six to twelve ring carbon atoms, such as caprolactam, caprylolactam and laurolactam, and also of dicarboxylic acids and diamines preferably with four to eighteen carbon atoms between the functional groups, such as hexamethylenediamine, octamethylenediamine, decamethylenediamine, dodecamethylenediamine, 2,4-di-(aminomethyl)-toluene, adipic acid, suberic acid, sebacic acid and heptadecanedicarboxylic acid. The high molecular weight polyamides may be prepared from one or more of the said initial materials in conventional manner and advantageously have K-values between 65 and 100, preferably between 70 and 90. The high molecular weight polyamides contain recurring —CONH— groups as essential parts of their chain molecules. Preferred high molecular weight polyamides are polycaprolactam, polyhexamethylene adipamide and copolycondensates of caprolactam, caprylolactam and hexamethylenediamine adipate. A large number of processes for the production of such polyamides is known and described, for example, in the book, "Die Polyamide," by H. Hopff, A. Müller and F. Wenger (Springer Verlag, Berlin-Gottingen-Heidelberg, 1954).

Suitable catalysts are organic free radical forming catalysts, especially organic peroxides and also azo-bis-isobutyronitrile and azodisulfonates. Especially suitable peroxides are those which decompose at temperature between 60° and 350°, preferably between 80° and 300° C., such as cumene hydroperoxide, tertiary-butyl peroxide, ditertiary-butyl peroxide, 2,5 - ditertiary - butyl - 2,5 - dimethylhexane, lauroyl peroxide and cyclohexanone peroxide. Such peroxides, as such or dissolved or dispersed in suitable solvents, may be mixed at room temperature with the high molecular weight polyamides in the conventional mixing apparatus before the high molecular weight polyamides are intensely kneaded. It is also possible however to introduce such peroxides into the machines used for the intense kneading at suitable points separately from the high molecular weight polyamides. Organic peroxides which decompose between room temperature and 60° C. may, however, also be used. Such peroxides are for example benzoyl peroxide, peracetic acid and perbenzoic acid. Cumene hydroperoxide, dicumyl peroxide, ditertiary-butyl peroxide, 3-butyl-4-methyl-4-hydroperoxy-5-dimethyloxazolidone-2 and the monotertiarybutyl ester of diperoxymaleic acid

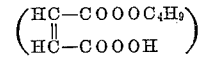

are preferred as organic peroxides. The radical-forming catalysts are advantageously mixed in the form of dilute solutions with the high molecular weight polyamides, for example by spraying them on to a granulate of the polyamides with powerful stirring, prior to the kneading. Water is especially suitable as a solvent for the readily decomposable peroxides.

According to this invention, the molten high molecular weight polyamides are intensely kneaded with the addition of free radical-forming catalysts. During kneading, the temperature is in general between about 190° and 350° C., preferably between 220° and 300° C. Machines suitable for kneading are especially single-shaft and twin-shaft screw extruders and multishaft disk kneaders. The residence period of the polyamides in the kneaders is in general about 20 to 120 seconds and is chosen the longer the higher the decomposition temperature of the radical-forming catalysts is. Shear stresses occur in the gaps of the machines suitable for kneading, these shear stresses being occasioned by relative motion between surfaces, for example the cylinder wall and the kneading disks in multishaft disk kneaders. These shear stresses may amount to as much as $1.5 \times 10^3$ kg./sq. cm. and more. The velocity gradients occurring in the gaps of the said kind during kneading in the said machines advantageously lie between about 1,000 and 20,000 sec.$^{-1}$ or more. Machines of the said type are the more suitable for the process, the higher the shear stresses attainable therewith. In the case of suitable twinshaft screw extruders and disk kneaders, the velocity gradients are preferably between 2,000 and 3,000 sec.$^{-1}$. In the case of high-speed single-shaft screw extruders which have an adjustable gap between the conical screw segment and the cylinder wall and whose screw rotates at 1,000 to 2,000 r.p.m., the velocity gradients are preferably between 10,000 and 20,000 sec.$^{-1}$.

The conventional pigments, stabilizers, lubricants and mold release agents may be added in conventional amounts to the high molecular weight polyamides for the process, in addition to the radical-forming catalysts. It is of special advantage to add 0.05 to 2% by weight, based on the total weight of the mixture, of low molecular weight polyamides having melting points above 250° C., particularly with melting points between about 300° and 320° C., to the linear high molecular weight polyamides according to the process according to the invention. Examples of such low molecular weight polyamides are dimeric, trimeric or tetrameric caprolactam and caprylolactam and also polycondensates preparable in convention manner from ethylenediamine or propylenediamine with oxalic, maleic, fumaric, succinic or glutaric acid having K-values between 10 and 40, preferably between 15 and 25. Pigments, stabilizers and low molecular weight polyamides of the said kind may however also be added to the crosslinked polyamides after their production.

By the process according to this invention, crosslinked high molecular weight polyamides are obtained which can be processed without difficulty and rapidly into shaped articles, for example by the use of conventional piston and screw injection molding machines, or to sheets, for example by the blowing method. Contrasted with known crosslinked and uncrosslinked high molecular weight polyamides—especially in the case of low water contents—the polyamides according to this invention are distinguished by high notched impact strength and at relatively high water contents by especially high tensile strength and are suitable for the production of shaped articles, such as household articles and machine parts, for example casings and gears, and also for the production of fibres, filaments, threads and bristles.

The invention is illustrated by, but not limited to, the following examples in which the parts specified are parts by weight. The K-values specified therein have been determined in concentrated sulfuric acid in 1% solution at 25° C. in conventional manner (cf. H. Fikentscher, "Cellulose Chemie," volume 13 (1932), page 58).

*Example 1*

95 parts polycaprolactam having the K-value 73.8 and 5 parts of a copolyamide prepared from 60 parts of hexamethylene adipamide and 40 parts of caprolactam, which has the K-value 71, are intensely mixed at room temperature with 0.5 part of ditertiary-butyl peroxide for twenty seconds in a commercially available propeller mixer. The mixture is then kneaded continuously for fifty seconds at 240° to 260° C. in a commercially available twin-shaft disk kneader and then granulated in conventional manner. A crosslinked polyamide is obtained which has the K-value 73.8. Test specimens of this polyamide with a water content of 0.07% by weight do not break when tested by the notched impact strength test according to DIN 53,453. After the polyamide has laid for an hour in boiling water according to DIN 53,371, the tensile strength is 512 kg./sq. cm.

By comparison, a mixture of 95 parts of polycaprolactam having the K-value 73.8 and 5 parts of the said copolyamide having the K-value 71, when intensely kneaded for 50 seconds at 240° to 260° C. in the same twin-shaft disk kneader without the addition of a radical-forming catalyst, gives a polyamide mixture which at a water content of 0.07% by weight has a notched impact strength of 3 to 4 cm. kg./sq. cm. according to DIN 53,453 and a tensile strength of 261 kg./sq. cm. after lying in boiling water for an hour according to DIN 53,371.

The crosslinked polyamide can be processed for example on conventional piston injection molding machines into shaped articles, such as plates, just as rapidly as the polyamide mixture. Shaped articles prepared from the crosslinked polyamide can be bent, but not broken, immediately after removal from the mold, while 80 to 90% of shaped articles prepared from the noncrosslinked polyamide mixture can readily be broken up immediately after removal from the mold.

*Example 2*

100 parts of polycaprolactam having the K-value 79.5 is mixed as described in Example 1 with 0.6 part of cumene hydroperoxide and the mixture intensely kneaded for about 40 seconds at 250° to 270° C. in a commercially available twin-shaft disk kneader and then granulated in the conventional way. A crosslinked polycaprolactam which has the K-value 79.3 is obtained; at a water content of 0.2% by weight it does not rupture upon a test of the impact strength according to DIN 53,453. After lying in boiling water for an hour, the product has a tensile strength of 523 kg./sq. cm. according to DIN 53,371. It is suitable for the production of shaped articles by injection molding and also for the production of blown sheets.

The polycaprolactam having the K-value 79.5 which is used has, at a water content of 0.2% by weight, a notched impact strength of 8 cm. kg./sq. cm. according to DIN 53,453 and after lying in boiling water for an hour has the tensile strength 395 kg./sq. cm. If this polycaprolactam is kneaded under the same conditions but without adding radical-forming catalysts, the product, at a water content of 0.2% by weight, has the notched impact strength of 6 cm. kg./sq. cm. and after lying in boiling water for one hour has the tensile strength 356 kg./sq. cm.

A crosslinked polycaprolactam prepared in conventional manner from caprolactam with the addition of 1% by weight of methylene-bis-caprolactam has, at a water content of 0.2% by weight, the notched impact strength of 9 cm. kg./sq. cm. and after lying in boiling water for one hour it has the tensile strength 325 kg./sq. cm. This caprolactam crosslinked in conventional manner can be processed into shaped articles in the conventional piston and screw injection molding machines only half as quickly as polycaprolactam which has been crosslinked according to the present invention.

*Example 3*

100 parts of polycaprolactam having the K-value 73.5 is intensely mixed, first with 0.5 part of ditertiary-butyl peroxide and then with 0.1 part of polyethylenediamine oxalate (nylon-2,2) having the K-value 18 and the melting point 314° C., 0.5 part of calcium stearte and 0.2 part of diisooctyl adipate at room temperature. The mixture is then kneaded for about sixty seconds in a commercially available twin-shaft disk kneader at 240° to 270° C. and then granulated in the conventional manner. A crosslinked polyamide is obtained which does not rupture in an impact strength test according to DIN 53,453 at a water content of 0.1% by weight. After lying in boiling water for one hour, it has the tensile strength 509 kg./sq. cm. and can be processed rapidly to shaped articles with the conventional screw and piston injection molding machines.

A mixture of 100 parts of polycaprolactam having the K-value 73.5, 0.1 part of polyethylenediamine oxalate (nylon-2,2) having the K-value 18 and the melting point 314° C., 0.5 part of calcium stearate and 0.2 part of diisooctyl adipate which has been intensely kneaded for sixty seconds at 240° to 270° C. in the same twin-shaft disk kneader without adding radical-forming catalysts has, at a water content of 0.1% by weight, the notched impact strength of 4 cm. kg./sq. cm. according to DIN 53,453 and after lying for an hour in boiling water it has the tensile strength 263 kg./sq. cm. With a given screw injection molding machine, about 10% less of shaped articles can be prepared from this non-crosslinked polycaprolactam than with the crosslinked polycaprolactam.

*Example 4*

100 parts of polyhexamethylene adipamide having the K-value 71.4 is intensely kneaded for fifty seconds at 270° to 290° C. in a commercially available twin-shaft screw extruder, consecutively with 0.5 part of ditertiarybutyl peroxide, 0.1 part of polyethylenediamine oxalate (nylon-2,2) having the K-value 21 and the melting point 315° C. and 0.2 part of 2-ethyl-hexyl adipate. A crosslinked polyhexamethylene adipamide is obtained which has the K-value 71.9. In a notched impact strength test according to DIN 53,453, test specimens having a water content of 0.05% by weight do not rupture. After the crosslinked polyamide has lain for one hour in boiling water it has the tensile strength 542 kg./sq. cm. according to DIN 53,371.

*Example 5*

A mixture of 50 parts of polycaprolactam having the K-value 72 and the melting range 212° to 216° C., 50 parts of a copolyamide derived from 35 parts of the adipic acid salt of hexamethylene diamine, 35 parts of the adipic acid salt of 4,4'-diaminodicyclohexylmethane, 30 parts of caprolactam of the K-value 67, and 0.5 part of 3 - butyl-4-methyl-4-hydroperoxy-5-dimethyloxazolidone-2 is intensely kneaded for 60 to 70 seconds at 240° to 260° C. in a twin-shaft disk kneader in whose shear field a velocity gradient G=2,500 to 3,000 sec.$^{-1}$ occurs, while supplying 28 kilowatt hours of kneading energy per 100 kg. of mixture. A crosslinked polyamide (A) is obtained having the K-value 71.6 and the melting range 183° to 187° C. In the dry state it has the tensile strength 646 kg./sq. cm. and can be injection molded in the production of combs weighing 28 g. in conventional piston injection molding machines with a molding cycle of 31 seconds. If 0.3 part of a low molecular weight polyamide derived from equimolar amounts of ethylene diamine and oxalic acid having the K-value 18 and the melting range 315° to 319° C. (nylon-2,2) is also added during the kneading, a crosslinked polyamide (B) is obtained having the same tensile strength as polyamide (A). Polyamide (B) can be injection molded under the above-mentioned conditions with a molding cycle of 17 seconds.

In contrast, a copolyamide having the K-value 70.8 and the softening range of 184° to 186° C., which has a tensile strength in the dry state of 631 kg./sq. cm., prepared in conventional manner from 65 parts of caprolactam, 17.5 parts of the adipic acid salt of hexamethylene diamine and 17.5 parts of the adipic acid salt of 4,4'-diaminodicyclohexylmethane, cannot be injection molded under the same conditions with a molding cycle of less than 54 seconds.

*Example 6*

Mixtures comprising in each case 100 parts of polycaprylolactam having the K-value 76 and a melting range of 195° to 198° C., 0.5 part of calcium stearate and 0.2 part of diisooctyl adipate, and the peroxides and low molecular weight polyamides set out in the following table, are kneaded for 90 seconds at 240° to 260° C. in a twin-shaft disk kneader whose shear field has a velocity gradient G=1,500 to 2,000 sec.$^{-1}$. Plates are prepared from the resultant products by injection molding.

The molding cycles attainable are specified in column 4 of the table.

Nylon-2,2 referred to in the table is a low molecular weight polyamide derived from equimolar amounts of ethylene diamine and oxalic acid having the K-value 18.

TABLE

| No. | Parts of peroxide | Parts of low molecular weight polyamide | Injection cycle period in seconds |
| --- | --- | --- | --- |
| 1 | 0.5 ditertiary-butyl peroxide | 0.1 nylon-2,2 | 17 |
| 2 | 0.5 3-butyl-4-methyl-4-hyrdoperoxy-5-dimethyloxazolidone-(2) | 0.1 nylon-2,2 | 17 |
| 3 | 0.5 ditertiary-butyl peroxide | | 21 |
| 4 | 1 ditertiary-butyl peroxide | 0.1 nylon-2,2 | 17 |
| 5 | 1.5 ditertiary-butyl peroxide | 0.1 nylon-2,2 | 17 |
| 6 | 0.7 monotertiary-butyl ester of diperoxymaleic acid. | 1 mixture of dimeric, trimeric and tetrameric caprolactam. | 22 |
| 7 | 0.3 ditertiary-butyl peroxide. | 0.7 mixture of dimeric, trimeric and tetrameric caprylolactam. | 18 |

As may be seen from the table, the molding cycle in processing the polycaprylolactam crosslinked according to this invention into plates is between 17 and 22 seconds. With polycaprylolactam having the K-value 76 and the melting range 195° to 198° C. and containing only 0.5% by weight of calcium stearate and 0.2% by weight of diisooctyl adipate, it is only possible to achieve a molding cycle of 54 seconds under otherwise identical conditions. With polycaprylolactam having the same properties and containing 0.1% by weight of nylon-2,2 having the K-value 18, in addition to 0.5% by weight of calcium stearate and 0.2% by weight of diisooctyl adipate, a molding cycle of only 32 seconds can be achieved under otherwise identical conditions.

What we claim is:

1. A process for the production of a crosslinked polyamide which comprises intensely kneading under a shear stress of the order of magnitude of $1.5 \times 10^3$ kg./sq. cm. at a temperature between about 190° C. and 350° C. a mixture of:
    (A) a molten high molecular weight linear polyamide characterized by recurring —CONH— units in an otherwise hydrocarbon chain of the polymer molecule and having a K-value between 65 and 100, measured as a 1% solution in concentrated sulfuric acid at 25° C.; and
    (B) about 0.1 to 2% by weight, based on the total weight of the mixture, of an organic peroxide which decomposes at a temperature between about room temperature and 350° C.

2. A process as claimed in claim 1 wherein the high molecular weight linear polyamide has a K-value of about 70 to 90.

3. A process as claimed in claim 1 wherein said organic peroxide is a compound selected from the class consisting of cumene hydroperoxide, tertiary-butyl peroxide, ditertiarybutyl peroxide, 2,5-ditertiary-butyl-2,5-dimethylhexane peroxide, lauroyl peroxide, cyclohexanone peroxide, benzoyl peroxide, peracetic acid, perbenzoic acid, dicumyl peroxide, 3 - butyl-4-methyl-4-hydroperoxy-5-dimethyl-oxazolidone-2 and the monotertiary-butyl ester of diperoxymaleic acid.

4. A process as claimed in claim 1 wherein the molten polyamide is the polycondensation product of a compound selected from the group consisting of caprolactam, caprylolactam, hexamethylene adipate, and mixtures thereof.

5. A process as claimed in claim 1 wherein said mixture contains about 0.3 to 0.8% by weight, based on the total weight of the mixture, of said organic peroxide.

6. A process as claimed in claim 1 wherein said mixture is intensely kneaded at a temperture of about 220° C. to 300° C.

7. A process as claimed in claim 1 wherein said mixture is intensely kneaded under a velocity gradient of about 1000 to 20,000 sec.$^{-1}$ for a period of about 20 to 120 seconds.

8. A process as claimed in claim 1 wherein there is added to said mixture of (A) and (B) about 0.05 to 2% by weight, based on the total weight of the mixture, of a low molecular weight linear polyamide characterized by recurring —CONH— units in an otherwise hydrocarbon chain of the polymer molecule, a melting point of above 250° C. and a K-value between about 10 and 40, measured as a 1% solution in concentrated sulfuric acid at 25° C.

9. A process as claimed in claim 8 wherein said low molecular weight polyamide has a melting point of about 300° C. to 320° C. and a K-value of about 15 to 25.

References Cited by the Examiner
UNITED STATES PATENTS

| | | | |
|---|---|---|---|
| 2,193,529 | 3/1940 | Coffman | 260—42 XR |
| 2,364,204 | 12/1944 | Fuller | 260—78 |
| 2,442,330 | 6/1948 | Fuller | 260—78 XR |
| 3,036,042 | 5/1962 | Schmidt et al. | 260—75 |
| 3,063,966 | 11/1962 | Kwolek et al. | 260—78 |

LEON J. BERCOVITZ, *Primary Examiner.*

DONALD E. CZAJA, *Examiner.*